United States Patent
Du et al.

(10) Patent No.: US 12,009,654 B2
(45) Date of Patent: Jun. 11, 2024

(54) MOTOR CONTROL SYSTEM AND MOTOR CONTROL DEVICE

(71) Applicant: BYD COMPANY LIMITED, Shenzhen (CN)

(72) Inventors: Zhiyong Du, Shenzhen (CN); Luhui Xu, Shenzhen (CN); Yilong Yu, Shenzhen (CN); Axi Qi, Shenzhen (CN); Guangming Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 181 days.

(21) Appl. No.: 17/786,941

(22) PCT Filed: Nov. 25, 2020

(86) PCT No.: PCT/CN2020/131510
§ 371 (c)(1),
(2) Date: Jun. 17, 2022

(87) PCT Pub. No.: WO2021/135739
PCT Pub. Date: Jul. 8, 2021

(65) Prior Publication Data
US 2023/0023760 A1 Jan. 26, 2023

(30) Foreign Application Priority Data
Dec. 31, 2019 (CN) .......................... 201911409307.6

(51) Int. Cl.
*H02H 7/08* (2006.01)
*H02P 27/08* (2006.01)

(52) U.S. Cl.
CPC .......... *H02H 7/0833* (2013.01); *H02P 27/08* (2013.01)

(58) Field of Classification Search
CPC .............................. H02H 7/0833; H02P 27/08
See application file for complete search history.

(56) References Cited

U.S. PATENT DOCUMENTS

| | | | |
|---|---|---|---|
| 5,305,215 A | 4/1994 | Brekkestran et al. | |
| 2012/0068645 A1* | 3/2012 | Tsuji | H02M 1/32 |
| | | | 318/400.21 |

(Continued)

FOREIGN PATENT DOCUMENTS

| | | |
|---|---|---|
| CN | 203434912 U | 2/2014 |
| CN | 104199370 A | 12/2014 |

(Continued)

OTHER PUBLICATIONS

The World Intellectual Property Organization (WIPO) International Search Report for PCT/CN2020/131510 dated Feb. 24, 2021 4 pages (with translation).

*Primary Examiner* — Zoheb S Imtiaz
(74) *Attorney, Agent, or Firm* — Wenye Tan

(57) ABSTRACT

An electric motor control system includes a master control module, a drive module, and a monitoring module. The master control module is configured to output a low-voltage drive signal to the drive module, the drive module converts the low-voltage drive signal into a high-voltage drive signal and outputs the high-voltage drive signal to a power unit, and the power unit outputs, according to the high-voltage drive signal, a power supply drive signal provided by a high-voltage battery. The monitoring module is electrically connected with the master control module and the drive module, and is configured to acquire the low-voltage drive signal, and output a fault signal to the master control module when the low-voltage drive signal is abnormal, to control the master control module to stop outputting the low-voltage drive signal.

11 Claims, 2 Drawing Sheets

(56) References Cited

U.S. PATENT DOCUMENTS

| | | | |
|---|---|---|---|
| 2015/0214863 A1 | 7/2015 | Sumi et al. | |
| 2015/0365039 A1* | 12/2015 | Nakano | F01P 7/048 318/503 |
| 2016/0373051 A1 | 12/2016 | Kudanowski | |
| 2017/0131379 A1 | 5/2017 | Omata et al. | |
| 2019/0225088 A1* | 7/2019 | Masuda | B60L 53/00 |

FOREIGN PATENT DOCUMENTS

| | | |
|---|---|---|
| CN | 206294107 U | 6/2017 |
| CN | 108681318 A | 10/2018 |
| CN | 208401757 U | 1/2019 |
| CN | 109733210 A | 5/2019 |
| CN | 109962617 A | 7/2019 |
| CN | 110112892 A | 8/2019 |

* cited by examiner

MOTOR CONTROL SYSTEM AND MOTOR CONTROL DEVICE

CROSS-REFERENCE TO RELATED APPLICATIONS

This application is a national stage entry under 35 U.S.C. § 371 of International Application No. PCT/CN2020/131510, filed on Nov. 25, 2020, which claims priority to and benefits of Chinese Patent Application No. 201911409307.6, entitled "ELECTRIC MOTOR CONTROL SYSTEM AND ELECTRIC MOTOR CONTROL APPARATUS" and filed on Dec. 31, 2019, the entire contents of all of which are incorporated herein by reference.

FIELD

The present disclosure relates to the field of motor control, and specifically, to an electric motor control system and an electric motor control apparatus.

BACKGROUND

With continuous development of science and technologies and advance of the times, motor applications have been closely related to various aspects of the society, for example, motors are applied to electric vehicles. The electric vehicles have increasingly attracted attention due to energy saving and environmental protection, and less air pollution. The electric vehicles can be classified into pure electric vehicles and hybrid electric vehicles, but the two types of electric vehicles are controlled by motor drive systems driving motors.

In electric motor control systems, in addition to the function and performance of motor control, the safety and reliability also need to be considered. However, the current electric motor control systems are not adequately designed for safety, resulting in low safety and poor reliability of the electric motor control systems. Consequently, unexpected faults cannot be effectively handled in time.

SUMMARY

To resolve the foregoing problems, a safe and reliable electric motor control system and electric motor control apparatus are provided.

An embodiment of the present disclosure provides an electric motor control system, including: a master control module, a drive module, and a monitoring module. The master control module is configured to output a low-voltage drive signal to the drive module, the drive module converts the low-voltage drive signal into a high-voltage drive signal and outputs the high-voltage drive signal to a power unit, the power unit outputs, according to the high-voltage drive signal, a power supply drive signal provided by a high-voltage battery, and the power supply drive signal is configured to drive a motor connected with the power unit to rotate. The monitoring module is electrically connected with the master control module and the drive module, and is configured to acquire the low-voltage drive signal, and output a fault signal to the master control module when the low-voltage drive signal is abnormal, to control the master control module to stop outputting the low-voltage drive signal. The monitoring module includes an auxiliary power supply, and the auxiliary power supply is independent of the master control module and provides a working power supply for the monitoring module.

An embodiment of the present disclosure provides an electric motor control apparatus including the foregoing electric motor control system.

Compared with the related art, according to the electric motor control system in the embodiments of the present disclosure, through multi-layer monitoring processing and independent safety switching paths for the motor control unit, and independent power supplies for powering the control unit and a monitoring unit, not only the safety level of the electric motor control system is improved and the safety operation of the electric motor control system is ensured, but also the situation that the control unit itself cannot normally detect unexpected faults is avoided, thereby effectively improving the safety runtime and operation reliability of the electric motor control system.

BRIEF DESCRIPTION OF THE DRAWINGS

To describe the technical solutions in the embodiments of the present disclosure more clearly, the following briefly describes the drawings required for the embodiments. Apparently, the drawings in the following description show some embodiments of the present disclosure, and a person of ordinary skill in the art can still derive other drawings from these drawings without creative efforts.

DETAILED DESCRIPTION

The following clearly and completely describes the technical solutions in the embodiments of the present disclosure with reference to the drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
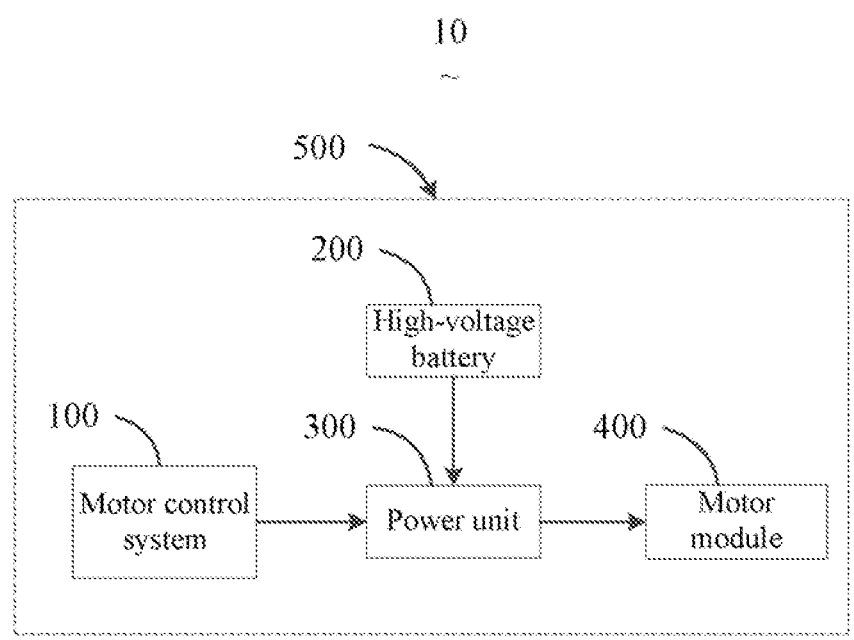
FIG. 1 is a schematic structural diagram of an electric motor control apparatus according to an embodiment of the present disclosure.

FIG. 1 is a schematic structural diagram of an electric motor control apparatus 10 according to an embodiment of the present disclosure. As shown in FIG. 1, the electric motor control apparatus 10 includes an electric motor control system 100, a high-voltage battery 200, a power unit 300, a motor module 400, and a housing 500. The electric motor control system 100 is configured to output a low-voltage drive signal to the power unit 300, and control an output of the low-voltage drive signal in real time according to a feedback signal outputted by the power unit 300.

Further, when the motor is faulty, the electric motor control system 100 determines whether the motor module 400 is abnormal after performing a logical operation according to the received feedback signal outputted by the power unit 300. When the motor module 400 is abnormal, the electric motor control system 100 stops outputting the low-voltage drive signal to the power unit 300 according to a preset program. The electric motor control system 100 may perform self-detection on an outputted motor control signal. When the motor control signal goes wrong, the electric motor control system 100 can quickly stop outputting the motor control signal, thereby improving the safety level of the electric motor control system and improving the safety runtime and operation reliability of the electric motor control system.

The power unit 300 is electrically connected with the high-voltage battery 200 and the motor module 400, and is configured to output a power supply drive signal provided by the high-voltage battery 200 to the motor module 400 under the control of the low-voltage drive signal outputted by the electric motor control system 100. The motor module 400 includes at least one alternating current motor or direct current motor, and the power supply drive signal is configured to drive the alternating current motor or direct current motor to rotate.

The motor module 400 drives the alternating current motor or direct current motor to rotate according to the received power supply drive signal, and outputs a feedback signal to the electric motor control system 100. The motor module 400 further includes a motor protection module (not shown in the figure) configured to protect the motor module 400 according to obtained motor motion data.

Further, when the motor module 400 is short-circuited, the motor protection module quickly disconnects the electrical connection between the motor and the power unit 300 according to an obtained short-circuit current, to avoid causing damage to the motor module.

A shape of the housing 500 may be designed according to actual applications of the electric motor control apparatus 10. Further, the electric motor control apparatus 10 is applicable to an electric vehicle, and controls the rotation of the motor, thereby increasing the safety runtime of the electric vehicle and improving the reliability and stability of the motor of the electric vehicle.

Figure 2:
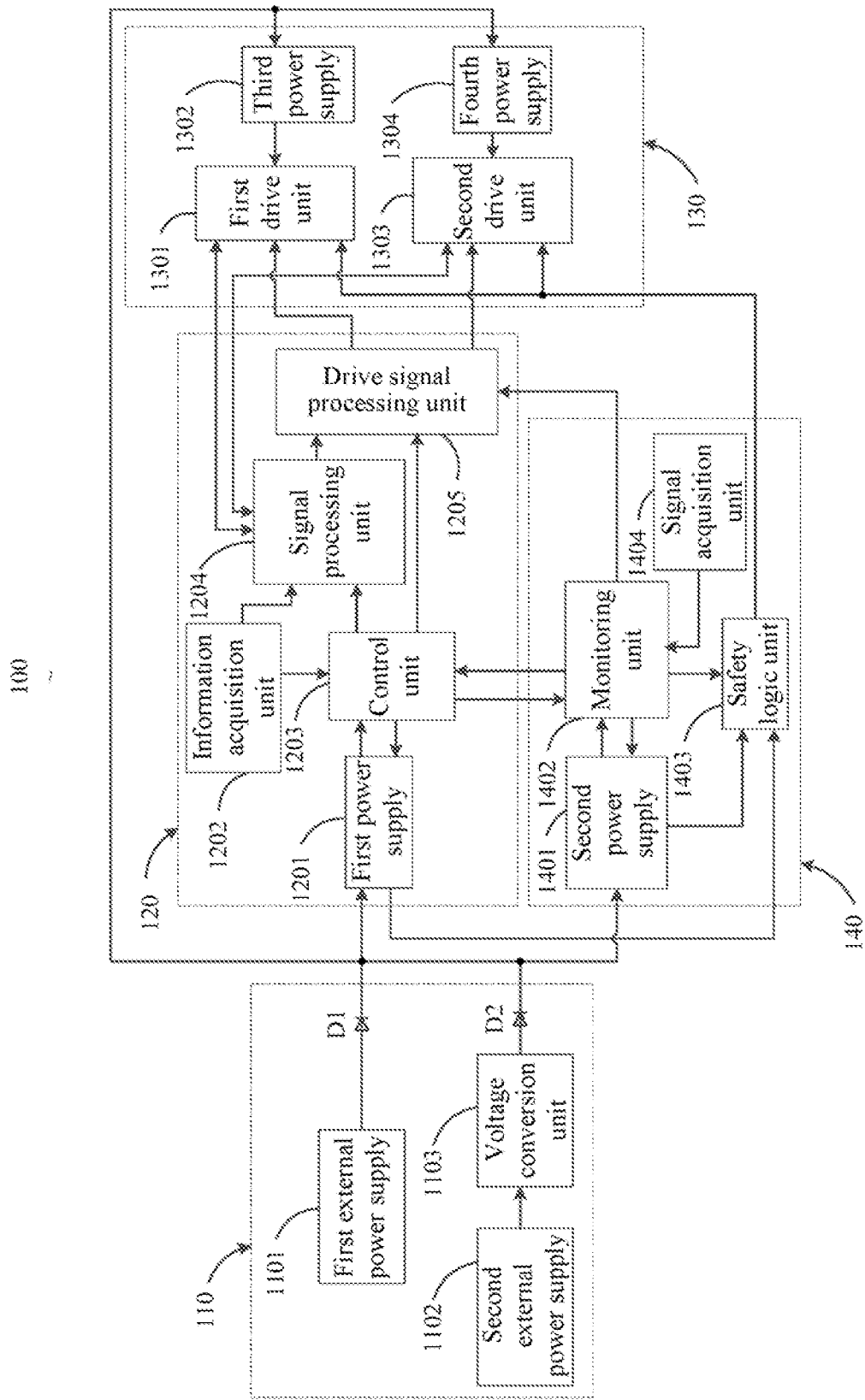
FIG. 2 is a circuit block diagram of an electric motor control system in the schematic structural diagram shown in FIG. 1.

FIG. 2 is a circuit block diagram of the electric motor control system 100 shown in FIG. 1 according to an embodiment of the present disclosure. As shown in FIG. 2, the electric motor control system 100 includes: an external power supply unit 110, a master control module 120, a drive module 130, and a monitoring module 140. In this embodiment, the electric motor control system 100 is configured to output the motor control signal to drive the motor to work, and monitor the motor control signal and acquire motor data information in real time, to reduce an output of a faulty motor control signal, thereby improving the performance of the electric motor control system and the safety level of motor operation.

The motor control signal includes a motor input current signal, a motor input voltage signal, a motor torque signal, a motor pulse width modulation (PWM) duty ratio signal, and the like.

The external power supply unit 110 is electrically connected with the master control module 120, the monitoring module 140, and the drive module 130, and is configured to provide a drive power supply VDD for the electric motor control system 100. The external power supply unit 110 includes a first external power supply 1101, a second external power supply 1102, a voltage conversion unit 1103, a first diode D1, and a second diode D2. Further, the first external power supply 1101 and the second external power supply 1102 are independent of each other in function, and may output a voltage independently or simultaneously, to prevent the external power supply unit 110 from failing to supply power to the electric motor control system due to a fault. The voltage conversion unit 1103 is electrically connected with the second external power supply 1102, and is configured to convert the received voltage, to output the drive power supply VDD. An anode of the first diode D1 is electrically connected with the first external power supply 1101, and a cathode of the first diode D1 is electrically connected with the master control module 120, the monitoring module 140, and the drive module 130. An anode of the second diode D2 is electrically connected with the voltage conversion unit 1103, and a cathode of the second diode D2 is electrically connected with the master control module 120, the monitoring module 140, and the drive module 130.

In this embodiment, the first diode D1 and the second diode D2 are configured to prevent an output voltage or abnormal voltage from being reversely inputted, to protect the safety of the external power supply unit 110. In a power supply process of the external power supply unit 110, if a first output voltage outputted by the first external power supply 1101 is greater than a second output voltage outputted by the voltage conversion unit 1103, the second diode D2 may prevent the first output voltage outputted by the first external power supply 1101 from being reversely inputted to the voltage conversion unit 1103. If the second output voltage outputted by the voltage conversion unit 1103 is greater than the first output voltage outputted by the first external power supply 1101, the first diode D1 may prevent the second output voltage from being reversely inputted to the first external power supply 1101. When the master control module 120, the monitoring module 140, and the drive module 130 are abnormal simultaneously or any one of the modules is abnormal, causing an excessively high voltage, the first diode D1 and the second diode D2 may prevent the abnormal voltage from being reversely inputted to the external power supply unit 110.

In this embodiment, the first external power supply 1101 may be a battery or a battery set, and directly outputs the drive power supply VDD suitably required by the electric motor control system 100. The second external power supply 1102 may be a high-voltage direct current power supply, and outputs the drive power supply VDD suitably required by the electric motor control system 100 after voltage conversion.

The master control module 120 is electrically connected with the drive module 130 and the monitoring module 140, and is configured to output the motor control signal to the drive module 130 according to the received drive power supply VDD, to drive the motor to operate. The master control module 120 includes a first power supply 1201, an information acquisition unit 1202, a control unit 1203, a signal processing unit 1204, and a drive signal processing unit 1205.

The first power supply 1201 is electrically connected with the control unit 1203 and the monitoring module 140, and is configured to output a first drive voltage VCC1 to the control unit 1203 according to the received drive power supply VDD, and output a first fault signal FS1 to the monitoring module 140 when the first power supply 1201 is faulty, to control the drive unit 130 to stop outputting a high-voltage drive signal. To improve the power supply independence and safety of the electric motor control system, the first power supply 1201 provides the first drive voltage VCC1 only for the master control module 120, and has a function of detecting its own fault. When no abnormality occurs in the first power supply 1201, a first fault signal FS1 of a first level is outputted to the monitoring module 140. When the first power supply 1201 is abnormal, for example, an output current or output voltage is excessively high, a first fault signal FS1 of a second level is outputted to the monitoring module 140 and the control unit 1203. The first power supply 1201 may be a master control power supply.

The information acquisition unit 1202 is electrically connected with the control unit 1203 and the signal processing unit 1204, and is configured to input an acquired motor motion signal to the control unit 1203 and the signal processing unit 1204. Further, the information acquisition unit 1202 includes a decoding unit, a current acquisition unit, a voltage acquisition unit, and other position sensor units. According to received motor position data information acquired by the other position sensor units, the decoding unit obtains a motor position signal angle after a logical calculation, and outputs the motor position signal angle to the control unit 1203. The current acquisition unit is configured to acquire an input current of the motor, and includes a current sensor. The voltage acquisition unit is configured to acquire an input voltage of the motor, and includes a voltage sensor.

In this embodiment, the other position sensor units include a resolver sensor, an encoder, and a Hall sensor. The motor motion signal includes the motor position signal angle, a motor input current Ic, and a motor input voltage Vc. The motor position signal angle includes a motor rotation angle.

The control unit 1203 is electrically connected with the signal processing unit 1204 and the drive signal processing unit 1205, and is configured to output a first duty ratio signal to the signal processing unit 1204 according to the received first drive voltage VCC1, and output a first enable signal EN1 to the drive signal processing unit 1205, to control the drive signal processing unit 1205 to output the low-voltage drive signal to the drive module 130. Further, after performing the logical calculation on the received motor position signal angle, the motor input current Ic, and the motor input voltage Vc, the control unit 1203 outputs a first disable signal dis1 to the drive signal processing unit 1205 when determining that the motor input voltage or current is abnormal, to control the drive signal processing unit 1205 to stop outputting the low-voltage drive signal.

When the control unit 1203 is faulty, the control unit 1203 sends a first control signal D S1 to the first power supply 1201. After receiving the first control signal D S1, the first power supply 1201 stops outputting the first drive voltage VCC1, thereby improving the safety and reliability of the motor and the control unit 1203. More specifically, the monitoring module 140 monitors in real time a motor torque value Mt, key variables, and a control sequence that are outputted by the control unit 1203. If an abnormality occurs, for example, the control signal outputted by the control unit 1203 is abnormal, the drive module 130 is turned off, to control the motor to stop operating.

The first duty ratio signal includes six paths of duty ratio control signals, each path of duty ratio control signal outputs only one signal, and each path of control signal in the first duty ratio signal may be the same control signal or a different control signal. For example, one path of control signal in the first duty ratio signal may be a current control signal, and the other paths of control signals may be a voltage control signal and various control signals, or current control signals. The motor torque value Mt may be obtained from a motor power and a motor rotation speed. The key variables are a value of the motor input current, a value of the motor input voltage, and the motor position signal that are outputted by the control unit 1203.

The signal processing unit 1204 is electrically connected with the drive signal processing unit 1205 and the drive module 130; is configured to perform dead zone detection processing on the received first duty ratio signal, and output a second duty ratio signal to the drive signal processing unit 1205; and is further configured to detect abnormal signal information according to received motor control information, and output a second control signal to the drive module 130 when the motor control information is abnormal, to control the drive module 130 to be in an electrically cutoff state. In the electric motor control system 100, if an abnormality such as short circuit or overvoltage that needs to be quickly handled occurs, the signal processing unit 1204 inputs an abnormal signal to the control unit 1203 after detecting an overcurrent signal OC and an overvoltage signal OV, the control unit 1203 outputs a first quick processing signal P1 to the signal processing unit 1204, and the signal processing unit 1204 outputs a second control signal P2 to the drive signal processing unit 1205, and controls the drive signal processing unit 1205 to perform off-wave and three-phase short-circuit processing on the drive module 130, to control the drive module 130 to stop outputting the high-voltage drive signal.

The second duty ratio signal includes the first duty ratio signal. Specifically, when the signal processing unit 1204 detects that a dead zone of the inputted first duty ratio signal is less than a dead zone of a preset PWM duty ratio signal, the signal processing unit 1204 sets the first duty ratio signal by using the dead zone of the preset PWM duty ratio signal. When the signal processing unit 1204 detects that the dead zone of the inputted first duty ratio signal is greater than the dead zone of the preset PWM duty ratio signal, the signal processing unit 1204 outputs the first duty ratio signal.

The first quick processing signal P1 is included in the first duty ratio signal, and the second control signal P2 is included in the second duty ratio signal. The second duty ratio signal also includes six paths of control signals, each path of control signal outputs only one signal, and each path of control signal in the second duty ratio signal may be the same control signal or a different control signal.

In this embodiment, the off-wave processing is to turn off a PWM signal output in the electric motor control system 100. The three-phase short-circuit processing is to control all switches of one part of drive units in the drive module 130 to be turned off, and control all switches of the other drive units to be turned on. The three-phase short-circuit processing may prevent the current from being reversely inputted to the drive module 130 and causing damage to the drive units in the drive module 130 due to the sudden power failure of motor control during the rotation of the motor, thereby improving the safety and reliability of the electric motor control system.

The drive signal processing unit 1205 is electrically connected with the drive module 130, and is configured to output a low-voltage drive signal according to the obtained second duty ratio signal, and output a drive enable signal to the drive module 130 according to a received enable control signal. The low-voltage drive signal includes a first drive signal PWM1 and a second drive signal PWM2, and the drive enable signal includes a first drive enable signal T1 and a second drive enable signal T2. Further, after processing the received second duty ratio signal, the drive signal processing unit 1205 outputs the first drive signal PWM1 and the second drive signal PWM2, to control different drive units in the drive module 130.

When the electric motor control system is faulty or abnormal in a circuit, the control unit 1203 outputs the first disable signal dis1 to the drive signal processing unit 1205. In this case, the drive signal processing unit 1205 stops outputting the first drive signal PWM1 and the second drive signal PWM2. After receiving the second control signal P2, the drive signal processing unit 1205 performs off-wave and three-phase short-circuit processing on the drive module 130.

In this embodiment, the drive signal processing unit 1205 receives a second enable signal EN2 and a second enable turn-off signal dis2 outputted by the monitoring module 140 simultaneously. When receiving the first enable signal EN1 the second enable signal EN2 simultaneously, the drive signal processing unit 1205 outputs a first drive signal PWM1 of the second level and a second drive signal PWM2 of the second level to the drive module 130. The first level includes a low level and a high level, and the second level includes a low level and a high level.

The drive module 130 is electrically connected with the master control module 120, the monitoring module 140, and the power unit 300, and is configured to convert the low-voltage drive signal into a high-voltage drive signal according to the received enable signal and the low-voltage drive signal, and output the high-voltage drive signal to the power unit 300. The drive module 130 includes a first drive unit 1301, a third power supply 1302, a second drive unit 1303, and a fourth power supply 1304.

The first drive unit 1301 is electrically connected with the signal processing unit 1204, and is configured to output a first motor drive signal PT1 to the power unit 300, and output a first insulated gate bipolar transistor (IGBT) signal to the signal processing unit 1204 when the first drive unit 1301 is faulty, to control the signal processing unit 1204 to output a quick processing signal, and control the first drive unit 1301 to perform off-wave and three-phase short-circuit processing. When the first drive unit 1301 is turned on, a third enable signal EN3 or a third disable signal dis3 outputted by the monitoring module 140 is received in real time. The first drive unit 1301 includes a three-phase upper bridge arm drive unit or a three-phase lower bridge arm drive unit.

The third power supply 1302 is electrically connected with the first drive unit 1301, and is configured to output the drive voltage VCC to the first drive unit 1301 according to the received drive power supply VDD.

The second drive unit 1303 is electrically connected with the signal processing unit 1204, and is configured to output a second motor drive signal PT2 to the power unit 300, and output a second IGBT signal to the signal processing unit 1204 when the second drive unit 1303 is faulty, to control the signal processing unit 1204 to output a quick processing signal, and control the second drive unit 1303 to perform off-wave and three-phase short-circuit processing. When the second drive unit 1303 is turned on, the third enable signal EN3 or the third disable signal dis3 outputted by the monitoring module 140 is received in real time. The second drive unit 1303 includes a three-phase upper bridge arm drive unit or a three-phase lower bridge arm drive unit.

The fourth power supply 1304 is electrically connected with the second drive unit 1303, and is configured to output the drive voltage VCC to the second drive unit 1303 according to the received drive power supply VDD. The fourth power supply 1304 and the third power supply 1302 are power supply modules whose functions are independent of each other, to prevent the drive units from stopping power supply simultaneously, thereby improving the reliability of the output signal of the drive module.

In this embodiment, the first drive unit 1301 and the second drive unit 1303 respectively output the first IGBT signal and the second IGBT signal to the signal processing unit 1204. If an IGBT module in the first drive unit 1301 or the second drive unit 1303 is faulty, the signal processing unit 1204 outputs the second control signal P2 to the first drive unit 1301 and the second drive unit 1303 according to a received IGBT fault signal, and controls the drive module 130 to perform off-wave and three-phase short-circuit processing.

If the monitoring module 140 detects that the control signal outputted by the master control module 120 goes wrong or the control sequence goes wrong, the monitoring module 140 outputs the third disable signal dis3, to respectively turn off the first drive unit 1301 and the second drive unit 1303 or simultaneously turn off the first drive unit 1301 and the second drive unit 1303.

The monitoring module 140 is electrically connected with the master control module 120 and the drive module 130, and is configured to acquire the low-voltage drive signal outputted by the master control module 120, and output a fault signal to the master control module 120 when the low-voltage drive signal is abnormal, to control the master control module 120 to stop outputting the low-voltage drive signal. The monitoring module 140 includes a second power supply 1401, a monitoring unit 1402, a safety logic unit 1403, and a signal acquisition unit 1404.

The second power supply 1401 is electrically connected with the monitoring unit 1402 and the safety logic unit 1403, and is configured to output a second drive voltage VCC2 to the monitoring unit 1402 according to the received drive power supply VDD, and output a second fault signal FS2 of the second level to the safety logic unit 1403 when the second power supply 1401 is abnormal or faulty. The safety logic unit 1403 outputs the third disable signal dis3 to the drive module 130. The second power supply 1401 may be an auxiliary power supply.

In this embodiment, functions of the first power supply 1201 and the second power supply 1401 are independent of each other. When the master control module 120 or the monitoring module 140 is faulty, only the first power supply 1201 or the second power supply 1401 needs to be turned off, and power supply requirements of other functional modules are not affected, thereby improving the safety level of the electric motor control system.

The monitoring unit 1402 is electrically connected with the safety logic unit 1403, the control unit 1203, and the drive signal processing unit 1205, and is configured to receive and detect the motor control signal, and output a second disable signal dis2 to the drive signal processing unit 1205 when the motor control signal is abnormal. If the monitoring unit 1402 is abnormal or faulty, a third fault signal FS3 of the second level is outputted to the safety logic unit 1403.

In this embodiment, the motor control signal outputted by the monitoring unit 1402 monitoring the control unit 1203 includes a control torque value N1, key variable signals, and the control sequence outputted by the control unit 1203. The key variable signals include a current signal, a voltage signal, and a motor position signal that are inputted by controlling the motor.

A three-phase current value, a three-phase voltage value, and motor rotation speed information when the motor works are acquired by external sensing. After the logical calculation is performed by the monitoring unit 1402, an actual output torque value N2 of the motor is obtained, and is compared with the control torque value N1 outputted by the control unit 1203. The monitoring unit 1402 may obtain the actual output torque value N2 of the motor according to formula (1) or formula (2), and the formulas are as follows:

$$N2 = 3p(i_q \psi_f + (L_d - L_q) i_d i_q)/2 \qquad (1)$$

where, $i_d$ represents a current of a motor rotor magnetic field direction, $\psi_f$ represents a motor rotor flux linkage, $L_d$ represents coordinates of the motor rotor magnetic field direction, $L_q$ represents coordinates perpendicular to the motor rotor magnetic field direction, $i_q$ represents a current perpendicular to the motor rotor magnetic field direction, and p represents the number of motor pole pairs.

$$N2=3p(i_\beta\psi_\alpha-i_\alpha\psi_\beta)/2 \qquad (2)$$

where, p represents the number of motor pole pairs, $i_\beta$ represents a current of an axis β in three-phase windings of the motor, $\psi_\alpha$ represents a value of a flux linkage of an axis α in a motor static coordinate system, $i_\alpha$ represents a current of an axis α in the three-phase windings of the motor, and $\psi_\beta$ represents a value of a flux linkage of an axis β in the motor static coordinate system.

If a deviation range between the actual output torque value N2 and the control torque value N1 is greater than a preset torque value N, the monitoring unit 1402 determines that the motor control signal outputted by the control unit 1203 is abnormal, and outputs the second disable signal dis2 to the drive signal processing unit 1205. After receiving the second disable signal dis2, the drive signal processing unit 1205 outputs the first drive enable signal T1 of the first level and the second drive enable signal T2 of the first level, to respectively control the first drive unit 1301 and the second drive unit 1303 to perform off-wave and three-phase short-circuit processing.

In this embodiment, the monitoring unit 1402 acquires in real time a motor data signal such as a current, a voltage, or a position required by the motor through the signal acquisition unit 1404, and the monitoring unit 1402 compares the acquired motor data signal with the motor control signal outputted by the control unit 1203. If a deviation between the motor data signal and the motor control signal is within a preset deviation range, the monitoring unit 1402 determines that the motor control signal outputted by the control unit 1203 is not abnormal, and the monitoring unit 1402 continuously outputs the second enable signal EN2 to the drive signal processing unit 1205. If the deviation between the motor data signal and the motor control signal is greater than the preset deviation range, the monitoring unit 1402 determines that the motor control signal outputted by the control unit 1203 is abnormal, and the monitoring unit 1402 continuously outputs the second disable signal dis2 to the drive signal processing unit 1205.

Further, preset deviation ranges of different control signals are different, and the preset deviation ranges are set according to actual working environments of the motor. The working environments of the motor are different, and preset deviation ranges of the same signal are also different. For example, in an electric vehicle, a range of a motor current deviation signal is between [−5% to 5%], a range of a motor voltage deviation signal is between [0 to 10%], and a range of a motor current deviation signal for controlling a vehicle window to be rolled up or down is between [−1% to 1%].

In this embodiment, the monitoring unit 1402 may further monitor an order of the control sequence outputted by the control unit 1203. In a preset time T, if the order of the control sequence outputted by the control unit 1203 is within a preset sequence deviation, the monitoring unit 1402 continuously outputs the second enable signal EN2 to the drive signal processing unit 1205; and if the order of the control sequence outputted by the control unit 1203 is beyond the preset sequence deviation, the monitoring unit 1402 continuously outputs the second disable signal dis2 to the drive signal processing unit 1205, to control the drive signal processing unit 1205 to stop outputting the low-voltage drive signal.

The preset time T is set according to actual operations of the motor. Different control sequences have different priorities, and the control sequences with different priorities correspond to different fault tolerance rates. A higher priority indicates a lower fault tolerance rate. A lower priority indicates a higher fault tolerance rate. For example, if a priority of one control sequence is 1, a fault tolerance rate thereof is 1%; and if a priority of another control sequence is 10, a fault tolerance rate thereof is 10%. A smaller priority number indicates a higher priority. In a process that multiple sequences are executed, if a control sequence with the priority of 1 has more than two control sequence deviations when being executed 100 times, the monitoring unit 1402 determines that an order of the control sequence exceeds the preset deviation range. If a control sequence with the priority of 10 has more than eleven control sequence deviations when being executed 100 times, the monitoring unit 1402 determines that an order of the control sequence exceeds the preset deviation range.

The safety logic unit 1403 is electrically connected with the first drive unit 1301 and the second drive unit 1303, and is configured to output the third disable signal EN3 to the first drive unit 1301 and the second drive unit 1303 according to received fault signals FS. The safety logic unit 1403 is configured to monitor whether the first power supply 1201, the second power supply 1401, and the monitoring unit 1402 are faulty. If one or more of the first power supply 1201, the second power supply 1401, and the monitoring unit 1402 output the fault signals FS to the safety logic unit 1403, the safety logic unit 1403 outputs the third disable signal EN3, to control all switch components in the first drive unit 1301 and the second drive unit 1303 to be turned off. The fault signals FS include the first fault signal FS1, the second fault signal FS2, and the third fault signal FS3.

In this embodiment, when the safety logic unit 1403 outputs the third enable signal EN3 and the drive signal processing unit 1205 outputs the first drive enable signal T1 of the second level and the second drive enable signal T2 of the second level, the first drive unit 1301 and the second drive unit 1303 output the motor drive signals.

The signal acquisition unit 1404 is electrically connected with the monitoring unit 1402, and is configured to acquire the motor data signal in real time, and input the motor data signal to the monitoring unit 1402. When the motor works, the signal acquisition unit 1404 obtains the current, the voltage, and the position of the motor through external sensors. The external sensors include a resolver sensor, an encoder, and a Hall sensor.

In the electric motor control system, the first external power supply 1101 and the second external power supply 1102 supply power to the master control module 120, the drive module 130, and the monitoring module 140 independently. When the motor is controlled to normally work, the monitoring unit 1402 detects the motor control signal outputted by the control unit 1203 in real time, the control unit 1203 outputs the first duty ratio signal to the signal processing unit 1204, and the signal processing unit 1204 outputs the second duty ratio signal to the drive signal processing unit 1205, and controls the drive signal processing unit 1205 to output the first drive signal PWM1 and the second drive signal PWM2, to control the first drive unit 1301 and the second drive unit 1303 respectively. In this embodiment, the monitoring unit 1402 and the control unit 1203 are powered by the first power supply 1201 and the second power supply 1401 whose functions are independent of each other.

In the electric motor control system, if detecting that the motor control signal outputted by the control unit 1203 is abnormal, the monitoring unit 1402 outputs the second disable signal dis2, to control the drive signal processing unit 1205 to output the first drive enable signal T1 of the first level and the second drive enable signal T2 of the first level, to further control the first drive unit 1301 and the second drive unit 1303 to perform off-wave and three-phase short-circuit processing. When the motor input current Ic and the motor input voltage Vc acquired by the information acquisition unit 1202 are abnormal and the first drive unit 1301 outputs the first IGBT fault signal or the second drive unit 1303 outputs the second IGBT fault signal to a quick processing unit 1204, the quick processing unit 1204 outputs the first enable signal EN1, to control the drive signal processing unit 1205 to stop outputting the first drive signal PWM1 and the second drive signal PWM2.

When any one or more units in the first power supply 1201, the second power supply 1401, and the monitoring unit 1402 are simultaneously faulty, that is, at least one fault signal FS is outputted, the safety logic unit 1403 outputs the third disable signal dis3 to the drive module 130.

Through multi-layer monitoring processing and independent safety switching paths for the master control module of the motor, the electric motor control system improves the fault diagnosis mechanism, optimizes and integrates control functions, and increases various methods for controlling the motor drive module. In this way, the safety level of the electric motor control system and the safety operation of the motor are improved, and the situation that the control unit itself cannot normally detect unexpected faults is avoided, thereby effectively improving the safety runtime and operation reliability of the electric motor control system.

A circuit block diagram of the electric motor control system according to an embodiment of the present disclosure is described in detail above. The principle and implementations of the present disclosure are described in this specification through specific examples. The description about the embodiments of the present disclosure is merely provided to help understand the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

What is claimed is:

1. An electric motor control system, comprising: a master control module, a drive module, and a monitoring module, wherein the master control module is configured to output a low-voltage drive signal to the drive module, the drive module converts the low-voltage drive signal into a high-voltage drive signal and outputs the high-voltage drive signal to a power unit, the power unit outputs, according to the high-voltage drive signal, a power supply drive signal provided by a high-voltage battery, and the power supply drive signal is configured to drive a motor connected with the power unit to rotate; and the monitoring module is electrically connected with the master control module and the drive module, and is configured to acquire the low-voltage drive signal, and output a fault signal to the master control module when the low-voltage drive signal is abnormal, to control the master control module to stop outputting the low-voltage drive signal, wherein the monitoring module comprises an auxiliary power supply, and the auxiliary power supply is independent of the master control module and provides a working power supply for the monitoring module, wherein the monitoring module further comprises a safety logic unit and a monitoring unit; the safety logic unit is electrically connected with the drive module, and is configured to output a third disable signal to the drive module when receiving the fault signal, to control the drive module to be electrically cut off, and the drive module comprises a first drive unit and a second drive unit, and is configured to start according to an enable signal of a first level outputted by the master control module, convert the low-voltage drive signal into a high-voltage drive signal, and output the high-voltage drive signal to the power unit; and the monitoring unit is electrically connected with the safety logic unit and a control unit, and is configured to receive a motor control signal outputted by the control unit, and output a second disable signal to the master control module when the monitoring unit determines that the motor control signal is abnormal, to control the master control module to stop outputting the low-voltage drive signal.

2. The electric motor control system according to claim 1, wherein the master control module comprises the control unit, a signal processing unit, and a drive signal processing unit; the control unit is electrically connected with the signal processing unit, the drive signal processing unit, a master control power supply, and the monitoring unit, and is configured to output a first duty ratio signal to the signal processing unit according to a received first drive voltage, and output a first disable signal to the drive signal processing unit when the motor control signal is abnormal, to control the drive signal processing unit to be electrically cut off, the signal processing unit is electrically connected with the drive signal processing unit and the drive module, and is configured to output a second duty ratio signal to the drive signal processing unit after processing the received first duty ratio signal, to control the drive signal processing unit to output the low-voltage drive signal; and the drive signal processing unit is electrically connected with the drive module, and is configured to output a drive signal of the first level to the drive module according to the received second duty ratio signal, to control the drive module to output the high-voltage drive signal.

3. The electric motor control system according to claim 2, wherein the control unit outputs the motor control signal after performing logical processing according to a motor motion signal acquired by an information acquisition unit; and the information acquisition unit is electrically connected with the control unit and the signal processing unit, and is configured to input the acquired motor motion signal to the control unit and the signal processing unit when the motor normally works; and the control unit outputs a quick processing signal to the signal processing unit if the motor motion signal is abnormal, to control the drive module to stop outputting the high-voltage drive signal.

4. The electric motor control system according to claim 2, wherein the control unit outputs a first control signal to the master control power supply when detecting that the control unit itself is abnormal, to control the master control power supply to stop outputting the first drive voltage; and the master control power supply is configured to provide an independent working power supply for the control unit; and the drive signal processing unit outputs a drive enable signal of a second level to the drive module when receiving the first disable signal or the second disable signal, to control the drive module to be in an electrically cutoff state.

5. The electric motor control system according to claim 1, wherein when the monitoring unit is abnormal, the monitoring unit outputs a third fault signal to the safety logic unit, and the safety logic unit outputs the third disable signal to the drive module, to control the drive module to be in an electrically cutoff state; and when the safety logic unit outputs a third enable signal and the drive signal processing unit outputs a drive enable signal of the first level, the drive module outputs the power supply drive signal.

6. The electric motor control system according to claim 5, wherein when at least one functional unit in the master control power supply, the auxiliary power supply, and the monitoring unit is faulty, the safety logic unit outputs the third disable signal to the drive module, to control the drive module to be in the electrically cutoff state.

7. The electric motor control system according to claim 5, wherein the master control power supply is electrically connected with the control unit and the safety logic unit, and is configured to convert a received drive power supply into the first drive voltage and output the first drive voltage to the control unit, and output a first fault signal to the safety logic unit and control the safety logic unit to output the third disable signal when the master control power supply is faulty, to control the drive module to be in the electrically cutoff state.

8. The electric motor control system according to claim 2, wherein when the first drive unit and the second drive unit are faulty, the signal processing unit outputs a second control signal to the drive module, to control the drive module to stop outputting the high-voltage drive signal, and controls the first drive unit to be electrically cut off and controls the second drive unit to be electrically turned on, or controls the second drive unit to be electrically cut off and controls the first drive unit to be electrically turned on.

9. The electric motor control system according to claim 8, wherein when the control unit outputs a first enable signal to the drive signal processing unit and the monitoring unit outputs a second enable signal to the drive signal processing unit, the drive signal processing unit outputs the low-voltage drive signal to the drive module.

10. The electric motor control system according to claim 9, wherein the master control power supply and the auxiliary power supply are independent of each other and are both electrically connected with an external power supply unit, the external power supply unit outputs the drive power supply to the master control power supply and the auxiliary power supply, the master control power supply outputs a first drive voltage to the control unit, and the auxiliary power supply outputs a second drive voltage to the monitoring unit.

11. An electric motor control apparatus, comprising an electric motor control system, wherein the electric motor control device comprises: a master control module, a drive module, and a monitoring module, wherein the master control module is configured to output a low-voltage drive signal to the drive module, the drive module converts the low-voltage drive signal into a high-voltage drive signal and outputs the high-voltage drive signal to a power unit, the power unit outputs, according to the high-voltage drive signal, a power supply drive signal provided by a high-voltage battery, and the power supply drive signal is configured to drive a motor connected with the power unit to rotate; and the monitoring module is electrically connected with the master control module and the drive module, and is configured to acquire the low-voltage drive signal, and output a fault signal to the master control module when the low-voltage drive signal is abnormal, to control the master control module to stop outputting the low-voltage drive signal, wherein the monitoring module comprises an auxiliary power supply, and the auxiliary power supply is independent of the master control module and provides a working power supply for the monitoring module, wherein the monitoring module further comprises a safety logic unit and a monitoring unit; the safety logic unit is electrically connected with the drive module, and is configured to output a third disable signal to the drive module when receiving the fault signal, to control the drive module to be electrically cut off, and the drive module comprises a first drive unit and a second drive unit, and is configured to start according to an enable signal of a first level outputted by the master control module, convert the low-voltage drive signal into a high-voltage drive signal, and output the high-voltage drive signal to the power unit; and the monitoring unit is electrically connected with the safety logic unit and a control unit, and is configured to receive a motor control signal outputted by the control unit, and output a second disable signal to the master control module when the monitoring unit determines that the motor control signal is abnormal, to control the master control module to stop outputting the low-voltage drive signal.

* * * * *